US009311210B1

(12) United States Patent
Schwartz

(10) Patent No.: US 9,311,210 B1
(45) Date of Patent: Apr. 12, 2016

(54) METHODS AND APPARATUS FOR FAULT DETECTION

(71) Applicant: VividCortex, Inc., Charlottesville, VA (US)

(72) Inventor: Baron Schwartz, Charlottesville, VA (US)

(73) Assignee: VIVIDCORTEX, INC., Charlottesville, VA (US)

( * ) Notice: Subject to any disclaimer, the term of this patent is extended or adjusted under 35 U.S.C. 154(b) by 161 days.

(21) Appl. No.: 14/200,746

(22) Filed: Mar. 7, 2014

Related U.S. Application Data

(60) Provisional application No. 61/774,201, filed on Mar. 7, 2013.

(51) Int. Cl.
*G06F 11/00* (2006.01)
*G06F 11/30* (2006.01)
*G06F 11/07* (2006.01)
*G06F 11/10* (2006.01)

(52) U.S. Cl.
CPC .......... *G06F 11/3096* (2013.01); *G06F 11/008* (2013.01); *G06F 11/0706* (2013.01); *G06F 11/1064* (2013.01)

(58) Field of Classification Search
CPC  G06F 11/008; G06F 11/0706; G06F 11/1064
See application file for complete search history.

(56) References Cited

U.S. PATENT DOCUMENTS

| | | | |
|---|---|---|---|
| 6,804,627 B1 | 10/2004 | Marokhovsky et al. | |
| 8,156,421 B2 | 4/2012 | Chhajer et al. | |
| 2005/0010578 A1 | 1/2005 | Doshi | |
| 2006/0106851 A1 | 5/2006 | Warshawsky | |
| 2007/0220371 A1* | 9/2007 | Duyanovich | G06F 11/3447 714/49 |
| 2007/0250538 A1 | 10/2007 | Moore | |
| 2008/0250046 A1 | 10/2008 | Nelson | |
| 2009/0249129 A1* | 10/2009 | Femia | G06F 11/008 714/47.2 |
| 2009/0327854 A1 | 12/2009 | Chhajer et al. | |
| 2011/0035363 A1 | 2/2011 | Warshawsky | |
| 2012/0054675 A1 | 3/2012 | Rajamannar et al. | |
| 2013/0097119 A1 | 4/2013 | Zeng | |
| 2013/0275372 A1 | 10/2013 | Giustra et al. | |
| 2014/0047096 A1* | 2/2014 | Kupershmidt | G06Q 10/0631 709/224 |

OTHER PUBLICATIONS

Wikipedia, "Control Chart," Dec. 14, 2012, 9 pages.
Wikipedia, "Exponential Smoothing," Feb. 15, 2013, 6 pages.

(Continued)

*Primary Examiner* — Charles Ehne
(74) *Attorney, Agent, or Firm* — Cooley LLP

(57) ABSTRACT

In some embodiments, a method includes receiving, at a data collection module implemented in at least one of a memory or a processing device, from a processing system, an observation value for a variable. The observation value of the variable is associated with operation of the processing system at a time. The method further includes computing a deviation value of the variable from a baseline value at the time based on the observation value. The method further includes computing a stableness value of the variable at the time based on the baseline value and a variance of the variable during a time period including the time. The method further includes transmitting an indication of the processing system as operating with a fault in response to the deviation value meeting a first criterion and the stableness value meeting a second criterion.

21 Claims, 7 Drawing Sheets

(56) References Cited

OTHER PUBLICATIONS

Nastel Technologies, Inc., "AutoPilot M6 Application Performance Management," Jan. 12, 2013, 5 pages.

Kalekar, P. S., "Time series forecasting using holt-winters exponential smoothing," Kanwal Rekhi School of Information Technology, Under the guidance of Prof. Bernard, Dec. 6, 2004, 13 pages.

Miller, E., "Holt-winters forecasting applied to poisson processes in real-time (DRAFT)," IMVU, Inc., Oct. 28, 2007, 10 pages.

* cited by examiner

METHODS AND APPARATUS FOR FAULT DETECTION

CROSS-REFERENCE TO RELATED APPLICATION

This application claims priority to and the benefit of U.S. Provisional Patent Application No. 61/774,201, filed Mar. 7, 2013 and entitled "Methods and Apparatus for Fault Detection," which is incorporated herein by reference in its entirety.

BACKGROUND

Some embodiments described herein relate generally to systems for observation, and, in particular, to methods and apparatus for observing a system or process, such as for detecting anomalies and faults of the system or process, in substantially real-time.

Some known fault detection systems use predefined, static thresholds to detect abnormal behaviors in a system or process. Such known fault detection systems, however, are typically not applicable to detect anomalies for a dynamic system or process, and are unable to detect unknown types of system or process faults. Some other known fault detection systems use dynamic or adaptive thresholds to detect abnormal behaviors. Such known fault detection systems, however, typically do not distinguish improbable or unusual behavior (i.e., abnormality) from bad behavior (i.e., fault). Moreover, such known fault detection systems typically are computationally expensive, thus infeasible to operate on a large scale and in substantially real-time.

Accordingly, a need exists for methods and apparatus that 1) can dynamically and automatically detect anomalies, 2) can distinguish faults from abnormal behaviors, and 3) are computationally inexpensive and scalable.

SUMMARY

In some embodiments, a method includes receiving, at a data collection module implemented in at least one of a memory or a processing device, from a processing system, an observation value for a variable. The observation value of the variable is associated with operation of the processing system at a time. The method further includes computing a deviation value of the variable from a baseline value at the time based on the observation value. The method further includes computing a stableness value of the variable at the time based on the baseline value and a variance of the variable during a time period including the time. The method further includes transmitting an indication of the processing system as operating with a fault in response to the deviation value meeting a first criterion and the stableness value meeting a second criterion.

DESCRIPTION

In some embodiments, a method includes receiving, at a data collection module implemented in at least one of a memory or a processing device, from a processing system, an observation value for a variable. The observation value of the variable is associated with operation of the processing system at a time. The method further includes computing a deviation value of the variable from a baseline value at the time based on the observation value. The method further includes computing a stableness value of the variable at the time based on the baseline value and a variance of the variable during a time period including the time. The method further includes transmitting an indication of the processing system as operating with a fault in response to the deviation value meeting a first criterion and the stableness value meeting a second criterion.

In some embodiments, an apparatus includes a data collection module implemented in at least one of a memory or a processing device. The data collection module is configured to receive, from a host device, an observation value for a variable. The observation value of the variable is associated with operation of the host device at a time. The apparatus further includes a compute module operatively coupled to the data collection module. The compute module is configured to compute a deviation value of the variable from a baseline value based on the observation value. The apparatus further includes a decision module operatively coupled to the compute module. The decision module is configured to send an indication, to a user device, that the host device is operating with a fault at the time in response to the observation value meeting a first criterion and the deviation value meeting a second criterion.

In some embodiments, a method includes receiving, at a data collection module implemented in at least one of a memory or a processing device, from a processing system, an observation value of a first variable. The observation value of the first variable is associated with an operation of the processing system at a first time within a time period. The method further includes receiving, at the data processing module, an observation value for a second variable. The observation value of the second variable is associated with an operation of the processing system at a second time within the time period. The method further includes computing a stableness value of the first variable based on a baseline value of the first variable and a variance of the first variable during the time period. The method further includes transmitting an indication that the processing system is operating with a fault in response to the observation value of the first variable meeting a first criterion, the observation value of the second variable meeting a second criterion, and the stableness value meeting a third criterion.

Figure 1:
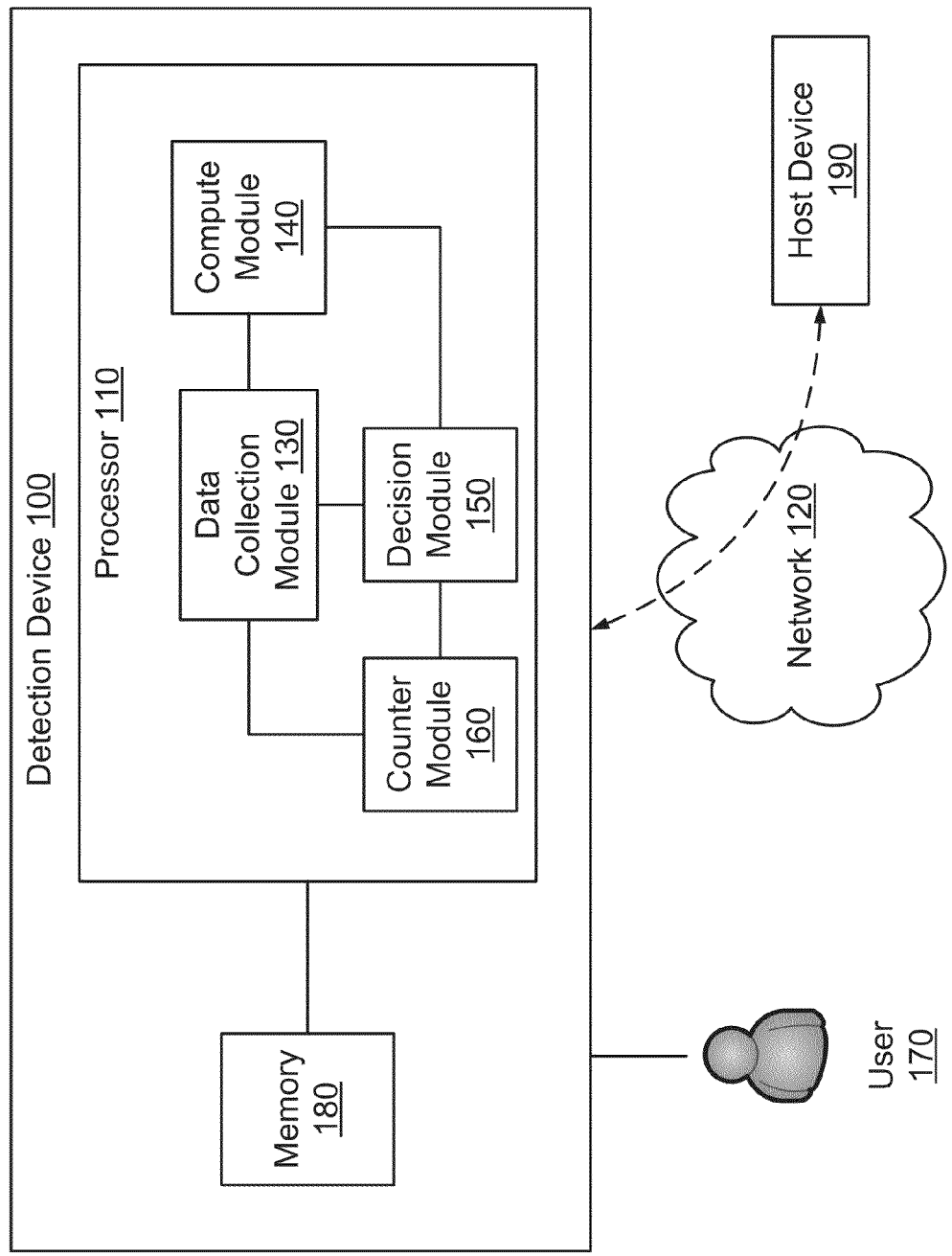
FIG. 1 is a schematic diagram that illustrates a detection device configured to detect anomalies of a system or process, according to an embodiment.

FIG. 1 is a schematic diagram that illustrates a detection device/apparatus 100 configured to observe operation of an operational entity 190 (sometimes referred to as a processing system, and/or as a host device). FIG. 1 illustrates the operational entity 190 as a host device, though it is understood that the host device can be any suitable entity being observed including, but not limited to, another device, apparatus, system, process, a thread executing within a process, and/or the like, including any sub-component (e.g., a sub-system) thereof. The observed operation can be any operational aspect of the operational entity 190, such as throughput, concurrency, consistency, and/or the like.

In some embodiments, the operation generates, is controlled by, and/or is otherwise associated with one or more observable parameters, variables, and/or the like. In such embodiments, observing the operation can include measuring, estimating, monitoring, analyzing, and/or receiving a value associated with the variable(s). In some embodiments, computation can be performed on the received variable value(s) to further analyze the operation.

As an example, in some embodiments, the detection device 100 can be configured to detect anomalies of a system or process executed at the host device 190. The host device 190 can be any device configured to host a system or execute a process that receives demand and responds to the demand in a manner that generates observable characteristics, such as, for example, throughput. The host device 190 can be, for example, a server, a compute device, a router, a data storage device, and/or the like. The system or process associated with the host device 190 can include, for example, computer software (stored in and/or executed at hardware) such as web application, database application, cache server application, queue server application, application programming interface (API) application, operating system, file system, etc.; computer hardware such as network appliance, storage device (e.g., disk drive, memory module), processing device (e.g., computer central processing unit (CPU)), computer graphic processing unit (GPU)), networking device (e.g., network interface card), etc.; and/or combinations of computer software and hardware (e.g., assembly line, automatic manufacturing process). In some embodiments, although not shown in FIG. 1, the detection device 100 can be operatively coupled to more than one host device or other devices, such that the detection device 100 can substantially simultaneously observe (e.g., to detect anomalies) more than one system and/or process according to embodiments described herein.

The detection device 100 can be any device with certain data processing and computing capabilities such as, for example, a server, a workstation, a compute device, a tablet, a mobile device, and/or the like. As shown in FIG. 1, the detection device 100 includes a memory 180, a processor 110, and/or other component(s) (not shown in FIG. 1). The memory 180 can be, for example, a Random-Access Memory (RAM) (e.g., a dynamic RAM, a static RAM), a flash memory, a removable memory, and/or so forth. In some embodiments, instructions associated with performing the operations described herein (e.g., fault detection) can be stored within the memory 180 and executed at the processor 110. The processor 110 includes a data collection module 130, a compute module 140, a counter module 160, a decision module 150, and/or other module(s) (not shown in FIG. 1). The detection device 100 can be operated and controlled by a user 170 such as, for example, an operator, an administrator, and/or the like.

Each module in the processor 110 can be any combination of hardware-based module (e.g., a field-programmable gate array (FPGA), an application specific integrated circuit (ASIC), a digital signal processor (DSP)), software-based module (e.g., a module of computer code stored in the memory 180 and/or executed at the processor 110), and/or a combination of hardware- and software-based modules. Each module in the processor 110 is capable of performing one or more specific functions/operations as described herein (e.g., associated with a detecting operation), as described in further detail with respect to FIGS. 2-6. In some embodiments, the modules included and executed in the processor 110 can be, for example, a process, application, virtual machine, and/or some other hardware or software module (stored in memory and/or executing in hardware). The processor 110 can be any suitable processor configured to run and/or execute those modules.

In some embodiments, the processor 110 can include more or less modules than those shown in FIG. 1. For example, the processor 110 can include more than one compute module to simultaneously perform multiple computing tasks for multiple systems and/or processes. In some embodiments, the detection device 100 can include more components than those shown in FIG. 1. For example, the detection device 100 can include a communication interface (e.g., a data port, a wireless transceiver and an antenna) to enable data transmission between the detection device 100 and the host device 190. In some embodiments, the detection device 100 can include or be coupled to a display device (e.g., a printer, a monitor, a speaker, etc.), such that an output of the detection device (e.g., a detection result) can be presented to the user 170 via the display device.

As used herein, a module can be, for example, any assembly and/or set of operatively-coupled electrical components associated with performing a specific function, and can include, for example, a memory, a processor, electrical traces, optical connectors, hardware executing software and/or the like. As used herein, the singular forms "a," "an" and "the" include plural referents unless the context clearly dictates otherwise. Thus, for example, the term "a compute module" is intended to mean a single module or a combination of modules configured to execute computing tasks associated with detecting anomalies of a system or process.

In some embodiments, as shown in FIG. 1, the detection device 100 can be operatively coupled to the host device 190 via, for example, a network 120. The network 120 can be any type of network that can operatively connect and enable data transmission between the detection device 100 and the host device 190. The network 120 can be, for example, a wired network (an Ethernet, local area network (LAN), etc.), a wireless network (e.g., a wireless local area network (WLAN), a Wi-Fi network, etc.), or a combination of wired and wireless networks (e.g., the Internet, etc.). For example, the detection device 100 can be a server placed at a centralized location in a data center and connected, via a LAN, to multiple host devices (similar or identical to the host device 190) that are distributed within the data center. Each host device can host and maintain a system (e.g., a file system), and/or execute a process (e.g., a web service). In such a deployment, the detection device 100 can monitor the operation of the multiple host devices, such as for detecting anomalies in the systems and processes hosted or executed at those host devices. In some other embodiments, the detection device 100 can be physically connected to the host device 190. In yet other embodiments, the detecting functionalities of the detection device 100 can be implemented within the host device 190. For example, an exemplary detection process (e.g., a detection process 200 shown and described with respect to Example 1 and FIG. 2) can be executed (stored in a memory and executed at hardware) within the host device 190, such that a detection result associated with the system or process of the host device 190 can be generated at the host device 190 and reported to a user.

The operation of the various modules is explained herein with reference to a single variable of a single operation on the host device 190 for simplicity, though it is understood that unless explicitly stated otherwise, aspects of the modules described herein are extendible to multiple variables, to multiple operations, and/or to multiple devices.

In some embodiments, the data collection module 130 can be configured to receive, from the host device 190, an observation value for a variable. In some embodiments, the observation value of the variable is associated with operation of the host device 190 at a time. In some instances, the time can be anytime in the past, such that the observation value of the variable is associated with operation of the host device 190 at a past time. In some instances, the observation value is received substantially in real time, such that the observation value of the variable is associated with current operation of the host device 190.

While not shown in FIG. 1, in some embodiments an agent associated with the detection device 100 can be installed and/or execute on the host device 190. The agent can monitor operational status of the host device 190 and/or provide updates on the operational status of the host device 190 to the data collection module 130.

In some embodiments, the compute module 140 is operatively coupled to the data collection module 130, and can be configured to compute a deviation value of the variable from a baseline value based on the observation value. In some embodiments, the baseline value is an average value of the variable over any suitable time period, or time window. In some embodiments, the baseline value is an exponentially weighted moving average (EWMA) of the variable. In some embodiments, the compute module 140 can be configured to set the deviation value of the variable to zero if the standard deviation of the variable is less than or equal to a threshold for the standard deviation. In some embodiments, the threshold for the standard deviation is zero.

In some embodiments, the deviation value is inversely correlated with a standard deviation of the variable at the time. Similarly stated, in such embodiments, the deviation value decreases as the standard deviation of the variable at the time increases. In some embodiments, the compute module 140 is configured to compute the deviation value by 1) subtracting the baseline value from the observation value, and 2) dividing the result by the standard deviation of the variable at the time.

In some embodiments, the counter module 160 is operatively coupled to the compute module 140, and is configured to determine that a predetermined number of observations for the variable has been received prior to the time. In such embodiments, the compute module can be configured to compute the deviation value of the variable based on the predetermined number of observations being received. In some embodiments, the predetermined number of observations is zero. In this manner, the predetermined number of observations can be tuned to affect how rapidly after initiating monitoring of the variable the detection device 100 begins evaluating deviation of the variable.

In some embodiments, the decision module 150 is operatively coupled to the compute module 140, and can be configured to determine if the observation value meets a criterion (sometimes referred to as a first criterion, or as a second criterion) for the observation value. In some embodiments, the compute module 140 updates a previously calculated baseline value to account for the observation value. For example, in some embodiments, the baseline value is an exponentially weighted moving average (EWMA) of the variable, and the updated baseline value is a EWMA for the variable that reflects the most recent observation (i.e., the observation value). In such embodiments, the criterion for the observation value can be based on the previously calculated baseline value of the variable, or on the updated baseline value of the variable. For example, the baseline value can be an EWMA computed by the compute module 140 that includes the observation value. In some embodiments, the criterion for the observation value is a threshold, and the observation value meets the criterion for the observation value when the observation value is greater than the threshold for the observation value. In other embodiments, the observation value meets the criterion for the observation value when the observation value is lesser than or equal to the threshold for the observation value. In yet other embodiments, the observation value meets the criterion for the observation value when, compared with a last received observation value, the observation value crosses the threshold for the observation value.

In some embodiments, the decision module 150 can be configured to determine if the deviation value meets a criterion (sometimes referred to as a first criterion, a second criterion, a third criterion, a fourth criterion, or a fifth criterion) for the deviation value. In some embodiments, the criterion for the deviation value is a threshold (sometimes referred to as a normalcy threshold) for the deviation value, and the deviation value meets the criterion for the deviation value when the deviation value is greater than the threshold for the deviation value. In other embodiments, the deviation value meets the criterion for the deviation value when the deviation value is lesser than or equal to the threshold for the deviation value. In yet other embodiments, the deviation value meets the criterion for the deviation value when, when compared with a last calculated deviation value, the deviation value crosses the threshold for the deviation value.

In some embodiments, the decision module 150 can be configured to send an indication, to a user device, that the host device 190 is operating with a fault at the time in response to the observation value meeting the criterion for the observation value. In some embodiments, the decision module 150 can be configured to send an indication, to the user device, that the host device 190 is operating with a fault at the time in response to the deviation value meeting a criterion for the deviation value. In some embodiments, the decision module 150 can be configured to send an indication, to a user device, that the host device 190 is operating with a fault at the time in response to the observation value meeting the criterion for the observation value and the deviation value meeting the criterion for the deviation value.

In some embodiments, the compute module 140 can be further configured to compute a stableness value of the variable at the time based on the baseline value and a variance of the variable during a time period that includes the time. The time period can be any suitable measurement window for the variable. In such embodiments, the decision module 150 can be further configured to send an indication that the host device 190 is operating with a fault in response to the observation value meeting the criterion for the observation value, the deviation value meeting the criterion for the deviation value, and the stableness value meeting a criterion for the stableness value. In some embodiments, the criterion for the stableness value is a threshold (sometimes referred to as a stability threshold) for the stableness value, and the stableness value meets the criterion for the stableness value when the stableness value is greater than the threshold for the stableness value. In other embodiments, the stableness value meets the criterion for the stableness value when the stableness value is lesser than or equal to the threshold for the stableness value. In yet other embodiments, the stableness value meets the criterion for the stableness value when, compared with a last calculated stableness value, the stableness value crosses the threshold for the stableness value.

In some embodiments, the variance of the variable is an exponentially weighted moving variance (EWMV) of the variable. In some embodiments, the stableness value is directly correlated with the variance of the variable. Similarly stated, in such embodiments, the stableness value increases as the variance of the variable increases. In some embodiments, the compute module 140 can be further configured to compute the stableness value by dividing the variance of the variable by the baseline value of the variable.

In some embodiments, the variable is a first variable and the time is a first time within the time period. The data collection module 130 can be further configured to receive an observation value for a second variable associated with operation of the host device 190 at a second time within the time period. In some embodiments, the compute module 140 can be further configured to compute a deviation value of the second variable from a baseline value of the second variable based on the observation value for the second variable. In some embodiments, the decision module 150 can be further configured to send an indication that the host device is operating with a fault at the second time in response to the deviation value of the first variable meeting the first criterion, the deviation value of the second variable meeting a second criterion, and a stableness value of the first variable meeting a third criterion.

Figure 2:
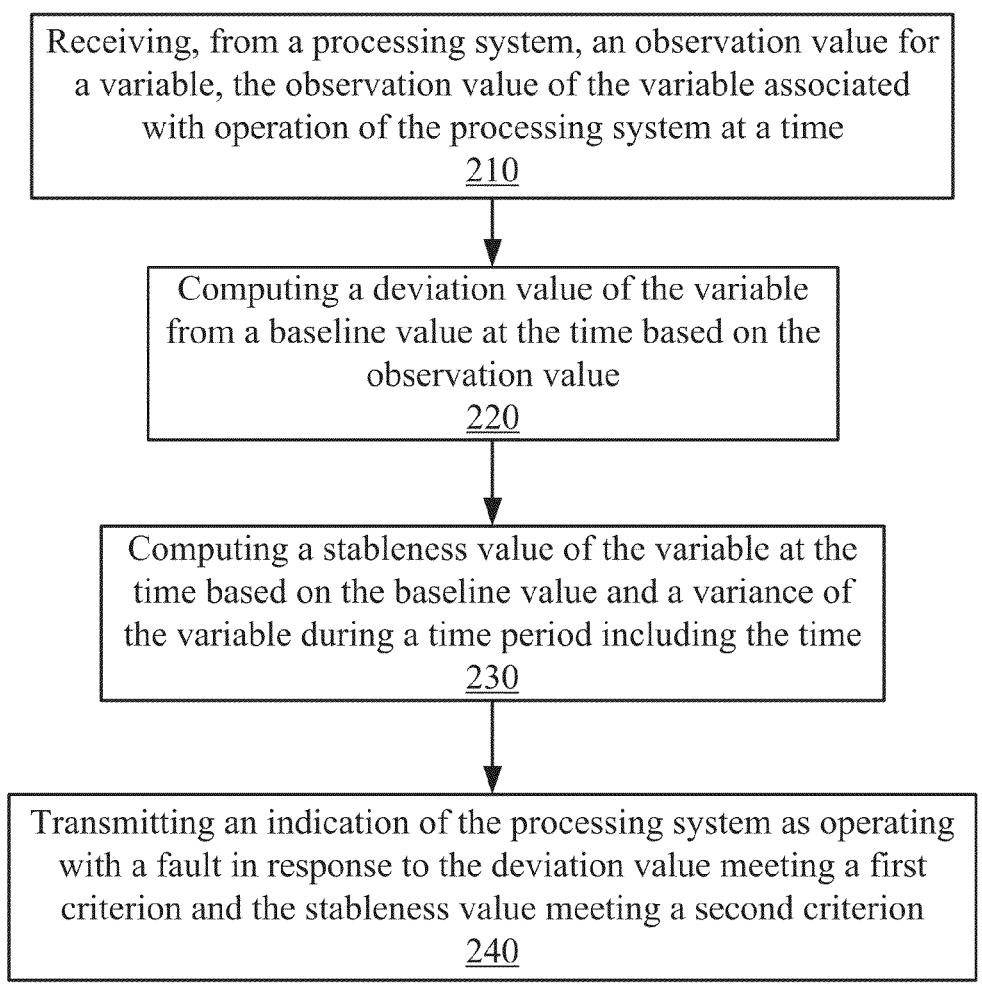
FIG. 2 is a flow chart illustrating a method, according to an embodiment.

FIG. 2 illustrates a method 200, according to an embodiment. In some embodiments, the method 200 can be performed by the processing device 100 of FIG. 1. The method 200 includes, at 210, receiving, at a data collection module implemented in at least one of a memory or a processing device (e.g., the data collection module 130), from a processing system (e.g., the host device 190), an observation value of a variable. The observation value of the variable is associated with operation of the processing system at a time. At 220, a deviation value of the variable is computed from a baseline value at the time based on the observation value. At 230, a stableness value of the variable is computed at the time based on the baseline value and a variance of the variable during a time period including the time. At 240, an indication that the processing system is operating with a fault is transmitted in response to the deviation value meeting a first criterion and the stableness value meeting a second criterion.

In some embodiments, the deviation value can be inversely correlated with a standard deviation of the variable at the time. Similarly stated, in such embodiments, the deviation value decreases as the standard deviation of the variable at the time increases. In some embodiments, computing the deviation value of the variable can include setting the deviation value of the variable to zero if the standard deviation of the variable is less than a threshold. In some embodiments, the deviation value of the variable meets the first criterion if the deviation value of the variable is greater than or equal to a normalcy threshold for the variable.

In some embodiments, transmitting the indication of the processing system as operating with a fault is further in response to the observation meeting a third criterion defined based on the baseline value. In some embodiments, the baseline value is an exponentially weighted moving average (EWMA) of the variable.

In some embodiments, the stableness value is directly correlated with the variance of the variable. Similarly stated, in such embodiments, the stableness value increases as the variance of the variable increases. In some embodiments, the variance of the variable is an exponentially weighted moving variance (EWMV) of the variable. In some embodiments, the stableness value of the variable meets the second criterion if the stableness value is less than a stability threshold.

In some embodiments, the variable is a first variable, and the method 200 can further include receiving, at the data collection module, from the processing system, an observation value for a second variable associated with operation of the processing system. In some embodiments, the method 200 can further include computing a deviation value of the second variable from a baseline value of the second variable at the time based on the observation value for the second variable. In some embodiments, the method 200 can further include transmitting an indication of the processing system as operating with a fault in response to the deviation value of the first variable meeting the first criterion, the stableness value meeting the second criterion, and the deviation value of the second variable meeting a third criterion.

In some embodiments, the variable is a first variable, and the method 200 can further include receiving, at the data collection module, from the processing system, an observation value for a second variable associated with operation of the processing system. In some embodiments, one of the first variable or the second variable is associated with throughput of the processing system, and the other of the first variable and the second variable is associated with concurrency of the processing system. In some embodiments, the method 200 can further include computing a deviation value of the second variable from a baseline value of the second variable at the time based on the observation value for the second variable. In some embodiments, the method 200 can further include transmitting an indication of the processing system as operating with a fault in response to the deviation value of the first variable meeting the first criterion, the stableness value meeting the second criterion, and the deviation value of the second variable meeting a third criterion.

Figure 3:
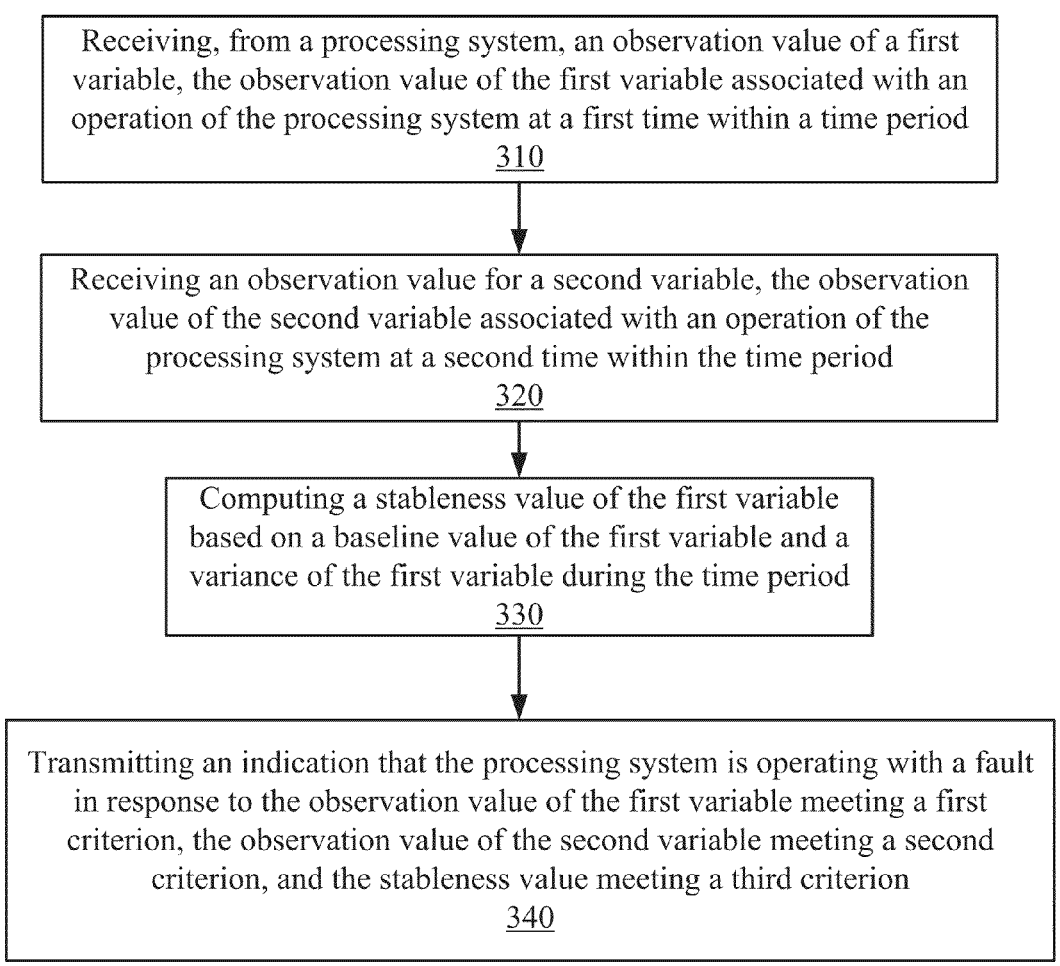
FIG. 3 is a flow chart illustrating another method, according to an embodiment.

FIG. 3 illustrates a method 300, according to an embodiment. In some embodiments, the method 300 can be performed by the processing device 100 of FIG. 1. At 310, an observation value of a first variable is received at a data collection module (e.g., the data collection module 130) implemented in at least one of a memory or a processing device (e.g., the processing device 100), from a processing system (e.g., the host device 190). The observation value of the first variable is associated with an operation of the processing system at a first time within a time period. At 320, an observation value for a second variable is received at the data collection module. The observation value of the second variable is associated with an operation of the processing system at a second time within the time period. At 330, a stableness value of the first variable is computed based on a baseline value of the first variable and a variance of the first variable during the time period. At 340, an indication that the processing system is operating with a fault is transmitted in response to the observation value of the first variable meeting a first criterion, the observation value of the second variable meeting a second criterion, and the stableness value meeting a third criterion. In some embodiments, one of the first variable or the second variable is associated with throughput of the processing system, and the other of the first variable and the second variable is associated with concurrency of the processing system.

In some embodiments, the method 300 further includes computing a deviation value of the first variable from the baseline value of the first variable at the first time based on the observation value for the first variable. In some embodiments, the method 300 further includes, computing a deviation value of the second variable from a baseline value of the second variable at the second time based on the observation value for the second variable. In some embodiments, transmitting the indication is further in response to the deviation value of the first variable meeting a fourth criterion and the deviation value of the second variable meeting a fifth criterion.

In some embodiments, the method 300 further includes computing the stableness value after receiving a predetermined number of observation values of the first variable and after receiving a predetermined number of observation values of the second variable. In some embodiments, the stableness value is directly correlated with the variance of the first variable, and the stableness value meets the third criterion if the stableness value is less than a stability threshold. In some embodiments, any of the first criterion, second criterion, third criterion, fourth criterion, fifth criterion disclosed herein can be programmable.

Embodiments disclosed herein can be beneficial for distinguishing between anomalous/abnormally behaving systems, and faulty systems. As an example, in some embodiments, a system would be deemed as not faulty if any of the following scenarios occur, upon receiving an observation value of throughput of the system:

the throughput is greater than the mean of the throughput—the system can be deemed to be performed normally since it is completing the work requested of it; or the deviation of the throughput, updated to reflect the observation value, is greater than a normalcy threshold. The deviation of throughput, in turn, is inversely correlated to the standard deviation of the throughput. If the system has perpetually highly variable behavior, the standard deviation is high, the resulting deviation is low, and the deviation is less likely to exceed the normalcy threshold; or the ratio of variance of throughput to the mean of the throughput is greater than a stability threshold. If the throughput of the system varies greatly (e.g., has a high variance relative to the mean), the baseline (e.g., mean) of the throughput is less likely to be significant. Similarly, if the throughput of the system is substantially constant (e.g., has a low variance relative to the mean), the baseline (e.g., mean) of the throughput is more likely to be significant. For example, a high value of variance or a low value of the mean of throughput will result in a higher value of the ratio, so the ratio is more likely to exceed the stability threshold.

Figure 4:
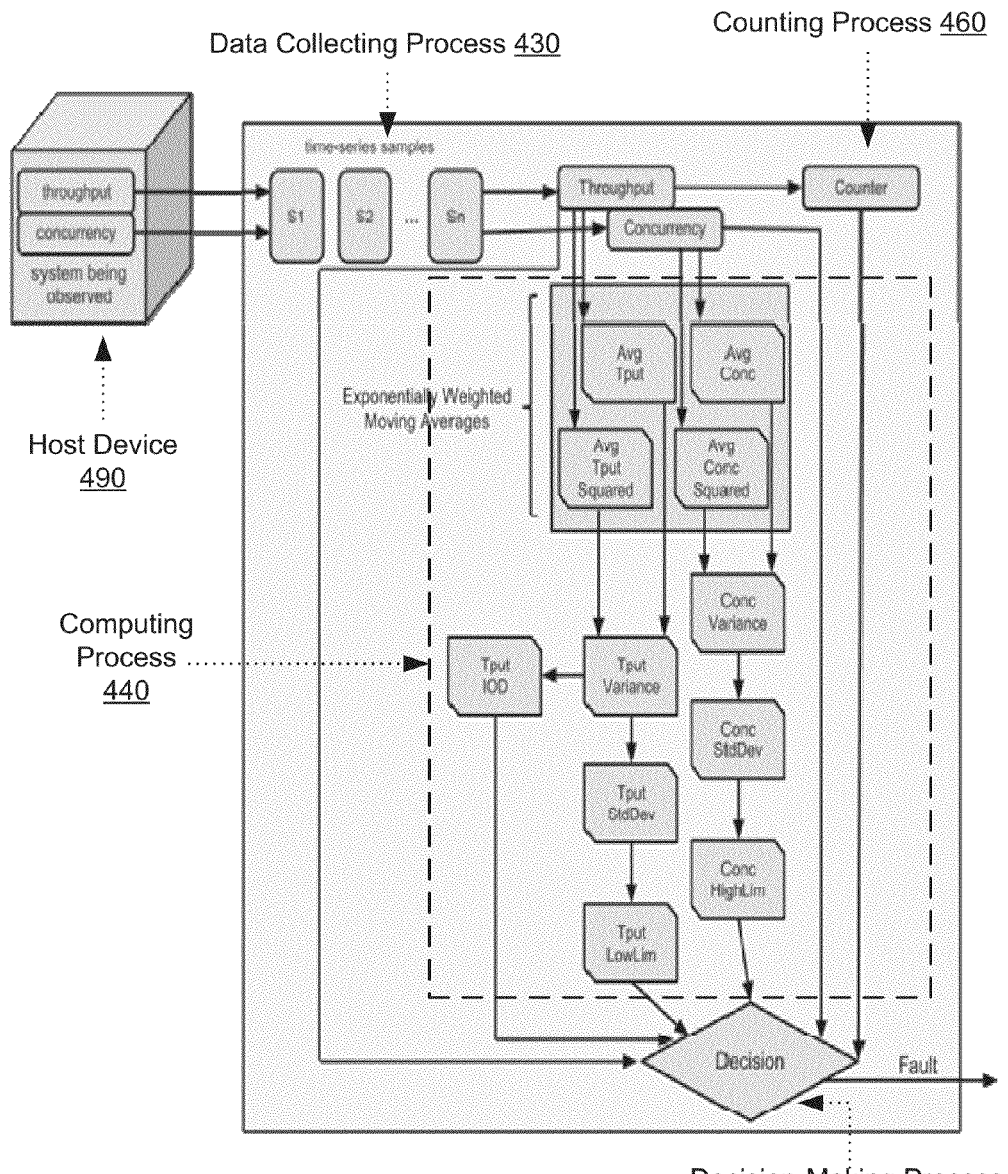
FIG. 4 is a schematic diagram that illustrates the detection device of FIG. 1 performing a detection process, according to an embodiment.

FIG. 4 is a schematic diagram that illustrates the detection device 100 of FIG. 1 performing a detection process 400, according to an embodiment. Each module in the processor 110 (shown in FIG. 1) can be configured to perform a portion of the detection process 400, as described in detail below.

The data collection module 130 (shown in FIG. 1) can be configured to perform a data collecting process 430 (shown in FIG. 4). Specifically, the data collection module 130 can receive, from the host device 190, observation data (e.g., "S1", "S2", "Sn" shown in FIG. 4) associated with the system or process being monitored. In some embodiments, the data collection module 130 can collect the observation data by, for example, periodically (e.g., once per second) sending data queries to the host device 190. In response to the data queries, the host device 190 can send requested observation data to the detection device 100. In some other embodiments, the host device 190 can be configured to provide the observation data in a certain manner (e.g., periodically, when a change in the data pattern is detected), and the detection device 100 can passively receive the observation data. For example, a server software executed at the host device 190 and associated with a system being monitored can periodically provide observation data to the detection device. In such embodiments, the detection device 100 can gather the observation data from the host device 190 without intruding upon the system or process being monitored.

In some embodiments, the observation data received from the host device 190 can include observation data on two variables associated with the system or process being monitored: throughput and concurrency. The throughput variable can be defined as the number of units of work completed per unit of time within the system or process. For example, for a database server, a throughput variable can be measured (e.g., by an agent at the database server) as queries that are handled by the database server per second. For another example, for a web server, a throughput variable can be measured (e.g., by an agent at the web server) as requests that are served by the web server per second. The concurrency variable can be defined as the number of units of work executing substantially simultaneously or substantially concurrently within the system or process at a given time. For example, for a database server, a concurrency variable can be measured (e.g., by an agent at the database server) as the number of client queries executing within the system or process at a given time. Typically, the values of the throughput variable and the concurrency variable change with time. Thus, measurements of the values of the two variables can be collected at different times and provided to the detection device 100 as series of observation data for detecting anomalies. Accordingly, as used herein, a variable can include and/or be associated with multiple observation values (e.g., an array or list of observation values). Each observation value of a variable can be associated with a measurement or observation of the variable (e.g., throughput, concurrency, etc.) at a given time. As described below, calculations on a variable can include calculations on the observation values associated with that variable. Thus, for example, a "mean of a variable" is the mean of the observation values of that variable.

The counter module 160 (shown in FIG. 1) can be configured to perform a counting process 460 (shown in FIG. 4). Specifically, the counter module 160 can maintain and operate one or more counters to record the number of observation data (e.g., the throughput variable and/or the concurrency variable) received in the data collecting process 430. Such a count result can be used in a decision-making process 450 as shown in FIG. 4 and described below. In some embodiments, the counter module 160 can maintain a counter for each variable being monitored (e.g., a first counter for the throughput variable, a second counter for the concurrency variable). In some embodiments, a counter maintained at the counter module 160 can be reset or modified based on, for example, a control instruction or a predefined circumstance. For example, the counter for the throughput variable can be reset to zero after a fault is detected based on the observation data of the throughput variable. For another example, the counter for the concurrency variable can be modified (e.g., decreased by one) in response to receiving an instruction indicating an outlier observation on the concurrency variable.

The compute module 140 (shown in FIG. 1) can be configured to perform a computing process 440 (shown in FIG. 4). Specifically, the compute module 140 can calculate, based on the observation data (e.g., of the throughput variable and/or of the concurrency variable) received from the host device 190, intermediate results that can be used in the final decision-making process 450. In some embodiments, the intermediate results include a metric representing deviation from normality for the observation data of the throughput variable (referred as "deviation of throughput" herein) and a metric representing deviation from normality for the observation data of the concurrency variable (referred as "deviation of concurrency" herein). As described in further detail herein, FIG. 4 depicts a method for computing a deviation from normality for a variable.

The decision module 150 (shown in FIG. 1) can be configured to perform the decision-making process 450 (shown in FIG. 4). Specifically, the decision module 150 can make a detection decision based on the intermediate results calculated from the computing process 440, the observation data received in the data collecting process 430, and/or the counter values provided from the counting process 460. In some embodiments, a detection decision can include, for example, a determination on whether a fault occurs in the system or process being monitored (e.g., at the host device 190 of FIG. 1). Finally, the detection device 100 can present the detection decision to, for example, a user (e.g., the user 170 in FIG. 1) such that the user can further examine the system or process.

Figure 5:
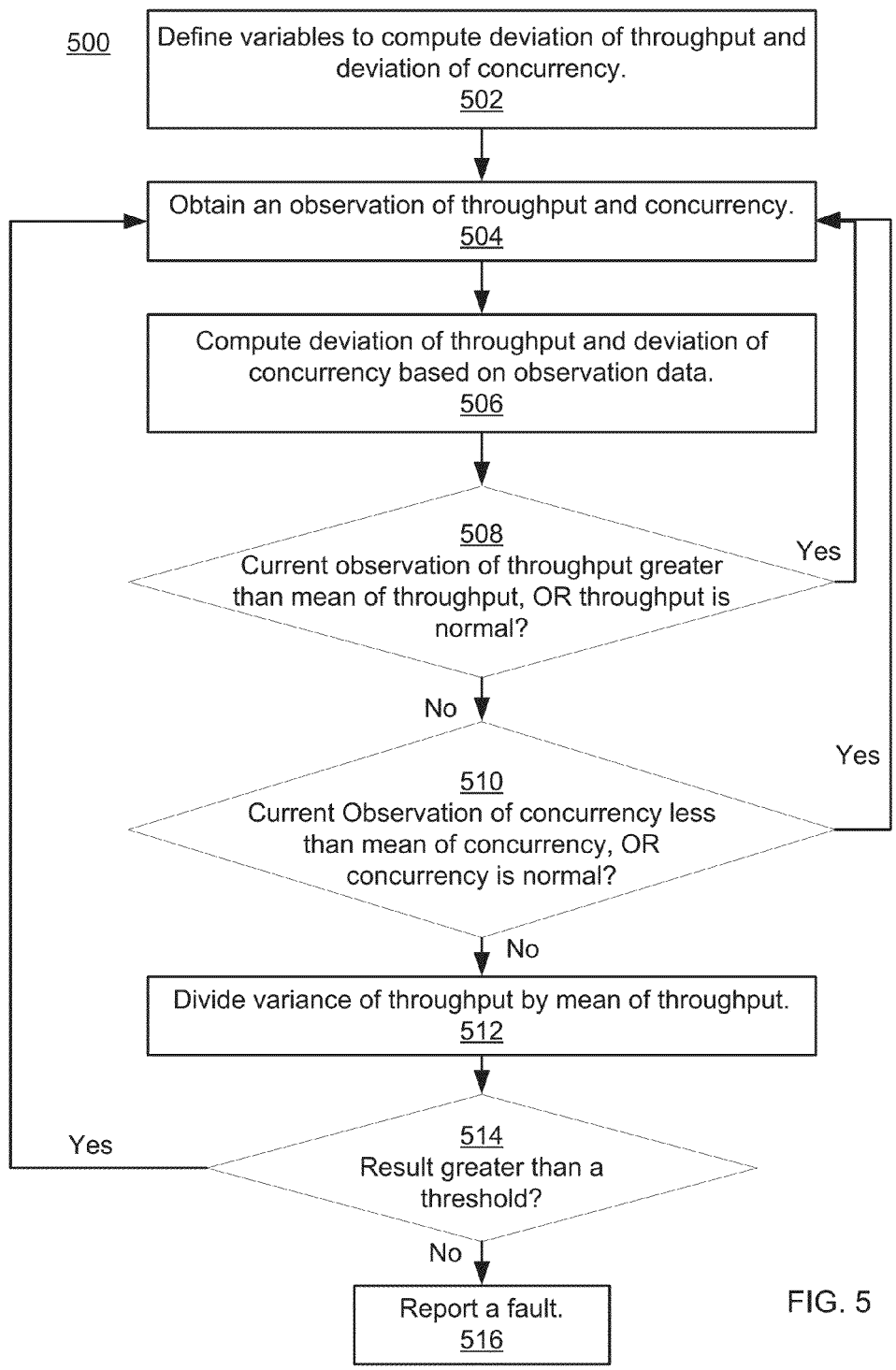
FIG. 5 is a flow chart illustrating a method for detecting faults, according to an embodiment.

FIG. 5 is a flow chart illustrating a method 500 for detecting faults, according to an embodiment. The code representing instructions to perform the method 500 can be stored in, for example, a non-transitory processor-readable medium (e.g., the memory 180 in FIG. 1) in a detection device that is similar to the detection device 100 shown and described with respect to FIG. 1. Particularly, the detection device can be operatively coupled to a host device (similar to the host device 190 in FIG. 1) that executes a system or process being monitored. The code stored in the non-transitory processor-readable medium (e.g., the memory 180 in FIG. 1) of the detection device can be executed by a processor of that detection device similar to the processor 110 in FIG. 1. Specifically, each portion of the code can be executed by a module of the processor that is similar to the module 130, 140, 150, or 160 shown and described with respect to FIGS. 1 and 4. As such, the method 500 can be similar to the detection process 400 shown and described with respect to FIG. 4. The code includes code to be executed by the processor to cause the detection device to perform the operations illustrated in FIG. 5 and described as follows.

At 502, a compute module (e.g., the compute module 140 in FIG. 1) of the detection device can define variables to compute deviation of throughput and deviation of concurrency. To calculate deviation of an observed variable (e.g., the throughput variable, the concurrency variable), the compute module can define 1) a parameter to store a current value of the observed variable (e.g., value of the most recently received observation of the variable), 2) a mean of the observation data of the observed variable (e.g., the "Avg Tput" and "Avg Conc" in FIG. 4), and 3) a mean of square of the observation date of the variable (e.g., the "Avg Tput Squared" and "Avg Conc Squared" in FIG. 4). Additionally, a counter module (e.g., the counter module 160 in FIG. 1) of the detection device can maintain a counter for each observed variable, and update the counter with each received observation of the variable.

In some embodiments, the mean of a variable can be defined as the exponentially weighted moving average (EWMA) of the observation data of the variable with an average observation age of a predefined number of samples. The predefined number can be, for example, 20, 30, 40 or another predefined number. In some embodiments, such an average observation age can be calibrated to reflect different degrees of emphasis placed on the recent behavior of the variable. Specifically, a shorter average observation age places less weight on the recent behavior of the variable and more weight on the current observation value of the variable (e.g., value of the most recently received observation of the variable). Similarly, the mean of the square of a variable can be defined as the EWMA of the square of the observation data of the variable with a pre-defined average observation age of a predefined number of samples. In other embodiments, a mean of a variable (or a mean of the square of a variable) can be defined in any other suitable method such as, arithmetic mean, geometric mean, harmonic mean, etc.

For example, in FIG. 4, "Throughput" represents the current value of the throughput variable (i.e., the most recently received observed throughput value); "Concurrency" represents the current value of the concurrency variable (i.e., the most recently received observed concurrency value); "Avg Tput" represents the mean (e.g., EWMA) of the throughput variable (i.e., the mean of the observation data of the throughput variable for a predefined number of samples); "Avg Conc" represents the mean (e.g., EWMA) of the concurrency variable (i.e., the mean of the observation data of the concurrency variable for a predefined number of samples); "Avg Tput Squared" represents the mean (e.g., EWMA) of the square of the throughput variable (i.e., the mean of the square of the observation data of the throughput variable for a predefined number of samples); and "Avg Conc Squared" represents the mean (e.g., EWMA) of the square of the concurrency variable (i.e., the mean of the observation data of the concurrency variable for a predefined number of samples).

At 504, a data collecting module (e.g., the data collecting module 130 in FIG. 1) of the detection device can obtain an observation (e.g., "S1", "S2," "Sn" in FIG. 4) of the throughput variable and an observation of the concurrency variable. This step is similar to the data collecting process 430 shown and described with respect to FIG. 4.

Figure 6:
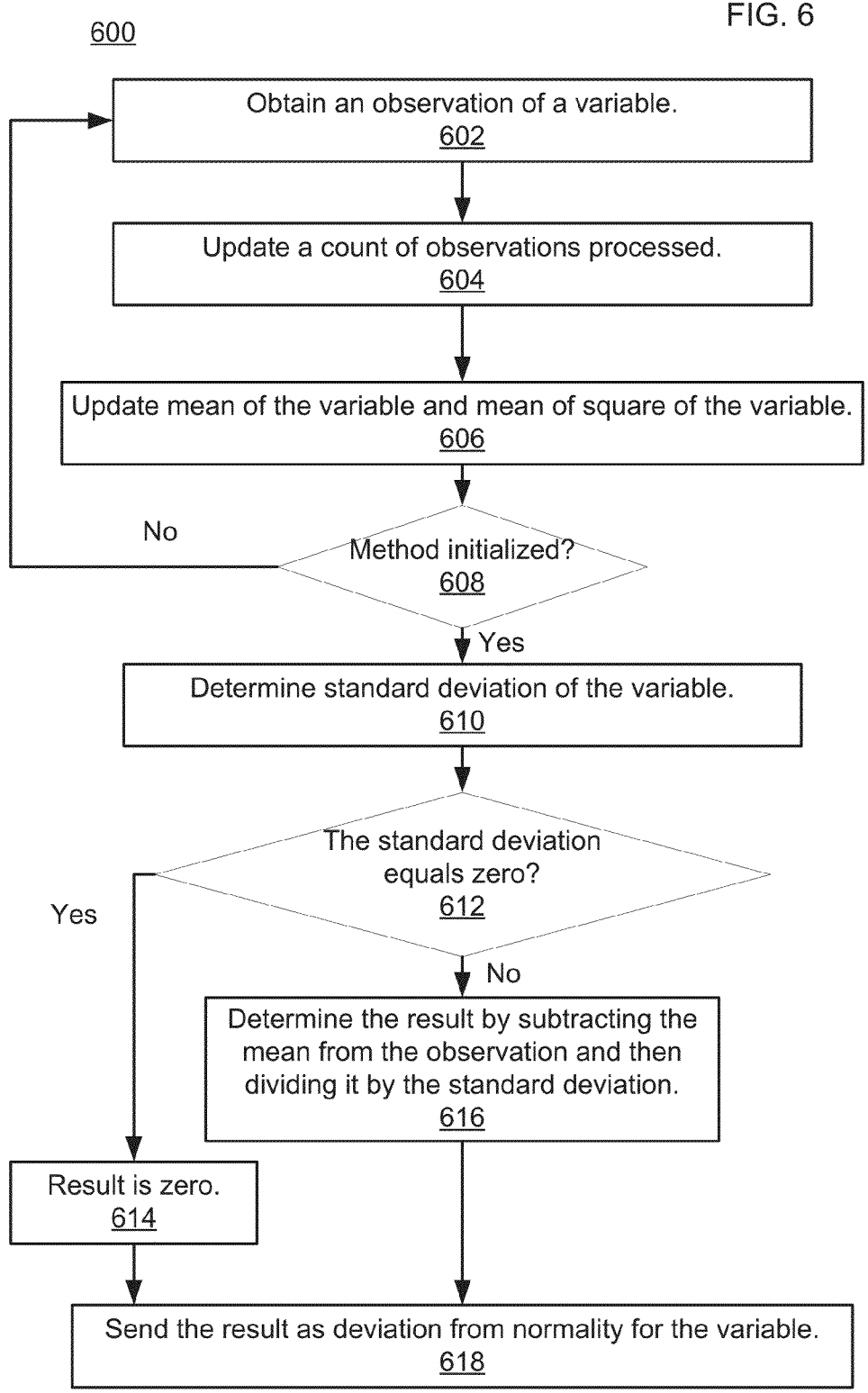
FIG. 6 is a flow chart illustrating a method for computing deviation from normality for a variable, according to an embodiment.

At 506, the compute module of the detection device can compute deviation of throughput and deviation of concurrency. FIG. 6 is a flow chart illustrating a method 600 for computing deviation from normality for a variable (e.g., the throughput variable, the concurrency variable), according to an embodiment. Similar to the method 500, the code representing instructions to perform the method 600 can be stored in a non-transitory processor-readable medium (e.g., the memory 180 in FIG. 1), and executed by a processor (e.g., the processor 110 in FIG. 1), of a detection device (e.g., the detection device 100 in FIG. 1). The method 600 can be similar to the computing process 440 shown and described with respect to FIG. 4. Particularly, the method 600 can be used to detect anomaly or abnormality in the variable (i.e., in a value of the variable). Such an anomaly detection method can be applied to the throughput variable, the concurrency variable, or any other arbitrary variable that is observable from the system or process being monitored. The code includes code to be executed by the processor to cause the detection device to perform the operations illustrated in FIG. 6 and described as follows.

At 602, a data collection module (e.g., the data collection module 130 in FIG. 1) of the detection device can obtain an observation of the variable. At 604, a counter module (e.g., the counter module 160 in FIG. 1) of the detection device can update a counter for observations of the variable. For example, in some embodiments, the counter can be increased by one each time a new observation of the variable is received.

At 606, a compute module (e.g., the compute module 140 in FIG. 1) of the detection device can update a mean of the variable and a mean of square of the variable. As described above with respect to step 502 of the method 500, the mean of a variable can be defined as, for example, the EWMA of the observation data of a variable with a pre-defined average observation age (e.g., 30 samples). Additionally, the compute module can set the value of the most recently received observation to the current value of the observed variable.

At 608, the compute module can determine whether the method 600 is initialized or not. In some embodiments, the compute module determines whether a certain number (as a predefined threshold, e.g., 10, 15) of observations of the variable have been collected and processed. Specifically, the compute module can check the counter for the number of received observations of the variable, and compare the number of the received observations of the variable (stored in the counter) with the predefined threshold. If the number of the received observations of the variable is less than the predefined threshold, the compute module can determine that an insufficient number of observations of the variable have been collected and processed. Thus, the method 600 is not initialized, and the method 600 returns to step 602 to obtain another observation of the variable (as shown in FIG. 6). As a result, the steps 602-608 are iterated repeatedly until a sufficient number of observations of the variable have been collected and processed. If the number of the received observations of the variable is greater than or equal to the predefined threshold, the compute module can determine that a sufficient number of observations of the variable have been collected and processed. Thus, the method 600 is initialized, and can proceed to next step 610. In some embodiments, the threshold for determining the initialization can be calibrated (e.g., by a user of the detection device) to change the number of samples used for the initialization. Specifically, a lower threshold indicates a fewer number of samples for the initialization, thus resulting in a quicker detection process.

At 610, the compute module can determine the standard deviation of the variable based on the collected observations of the variable. In some embodiments, for example, the standard deviation of a variable can be defined as the square root of the exponentially weighted moving variance (EWMV) of the variable (i.e., the EWMV of the observation data for that variable). A EWMV of a variable can be defined as the difference between the mean (e.g., EWMA) of the variable (i.e., the mean of the observation data for that variable) and the mean (e.g., EWMA) of the square of the variable (i.e., the mean of the square of the observation data of that variable). In other embodiments, the standard deviation of a variable can be computed using any other suitable method. For example, in FIG. 6, "Tput Variance" represents the variance (e.g., EWMV) of the throughput variable; "Conc Variance" represents the variance (e.g., EWMV) of the concurrency variable; "Tput StdDev" represents the standard deviation of the throughput variable; and "Conc StdDev" represents the standard deviation of the concurrency variable.

At 612, the compute module can determine whether the calculated standard deviation of the variable equals zero. If the calculated standard deviation of the variable equals zero, at 614, a result, as the deviation from normality for the variable, is determined to be zero. Otherwise, if the calculated standard deviation of the variable does not equal zero, at 616, the compute module can calculate the result by subtracting the mean (e.g., EWMA) of the variable from the current value of the variable (i.e., the value of the most recently received observation of the variable), and dividing the result of the subtraction by the calculated standard deviation of the variable (a non-zero value in this scenario). In the second scenario, the result can be a real number ranging from negative infinity to positive infinity except zero.

At 618, the compute module can send the result to, for example, a decision module (e.g., the decision module 150 in FIG. 1) of the detection device for further processing. Such a result (e.g., a real number ranging from negative infinity to positive infinity including zero) can indicate the most recently received observation's deviation from the variable's recent historical behavior of a normalized magnitude. The deviation from normality for the variable (e.g., the deviation of throughput or the deviation of concurrency as defined above) can be used for many purposes including detecting anomaly and/or fault associated with the system or process being monitored. In some embodiments, although not shown and described herein, the deviation from normality for a variable and/or other variables and methods described herein can be used to, for example, produce a health indicator for a system or process, which can be tracked to detect changes in the system or process; determine correlations between anomalies in variables; trigger data collection at the instant of a fault to support later diagnosis; generate a "fault signature" that can be used to suggest root cause of observed faults based on the root cause of other faults with similar signatures; suggest relevant data and variables that may be fruitful to investigate; and so on.

Returning to FIG. 5, at 506, the deviation of throughput and the deviation of concurrency can be calculated at the compute module using, for example, the method 600 described above. At 508, the compute module can determine whether the current value of the throughput variable (i.e., the value of the most recently received observation of the throughput variable) is greater than the mean (e.g., EWMA) of the throughput variable, and/or whether the performance of the throughput variable is abnormal, as described in further detail herein. If the compute module determines that the current value of the throughput variable (e.g., "Throughput" in FIG. 4) is greater than the mean of the throughput variable (e.g., "Avg Tput" in FIG. 4), the compute module can interpret such a result as an indication that the system or process being monitored is not producing abnormally low throughput. Thus, no anomaly is detected with respect to the throughput variable. Alternatively, if the compute module determines that the performance of the throughput variable is not abnormal (as defined below), the compute module can interpret the result as an indication that no anomaly is detected with respect to the throughput variable. Thus, the method 500 returns to step 504 to collect and process next observation of the throughput variable.

In some embodiments, an abnormal performance for a variable (e.g., the throughput variable, the concurrency variable) can be defined as the deviation from normality for that variable (e.g., the deviation of throughput, the deviation of concurrency) having an absolute value greater than or equal to a predefined threshold (e.g., 2, 3, 4, etc.). In some embodiments, such a predefined threshold on the absolute value of the deviation from normality for a variable can be calibrated (e.g., by a user of the detection device) to reflect different standards for abnormality and/or adjust sensitivity of the method 300 with respect to different variables. Specifically, a lower threshold for a variable indicates a lower standard of abnormality (easier to satisfy) for the variable, and higher sensitivity (easier to detect abnormality) of the method 500 with respect to the variable.

If the compute module determines that the current value of the throughput variable is less than or equal to the mean of the throughput variable, and the performance of the throughput variable is abnormal (i.e., the absolute value of the deviation of throughput is greater than or equal to the predefined threshold), the compute module can interpret the result as an indication that the system or process being monitored is producing abnormally low throughput. For example, in FIG. 4, "Tput LowLim" represents a variable (e.g., a binary variable, a flag) that indicates whether the throughput is abnormally low. Then the compute module can proceed to step 510 to determine whether the system or process is experiencing abnormally high concurrency.

At 510, similar to step 508, the compute module can determine whether the current value of the concurrency variable (i.e., the value of the most recently received observation of the concurrency variable) is less than the mean (e.g., EWMA) of the concurrency variable, and/or whether the performance of the concurrency variable is abnormal (using the method to determine an abnormal performance of a variable, as described above). If the compute module determines that the current value of the concurrency variable (e.g., "Concurrency" in FIG. 4) is less than the mean of the concurrency variable (e.g., "Avg Conc" in FIG. 4), the compute module can interpret the result as an indication that the system or process being monitored is not experiencing abnormally high concurrency. Thus, no anomaly is detected with respect to the concurrency variable. Alternatively, if the compute module determines that the performance of the concurrency variable is not abnormal (i.e., the absolute value of the deviation of concurrency is less than the predefined threshold), the compute module can interpret the result as an indication that no anomaly is detected with respect to the concurrency variable. Thus, the method 500 returns to step 504 to collect and process next observation of the concurrency variable.

If the compute module determines that the current value of the concurrency variable is greater than or equal to the mean of the concurrency variable, and the performance of the concurrency variable is abnormal (i.e., the absolute value of the deviation of concurrency is greater than or equal to the predefined threshold), the compute module can interpret the result as an indication that the system or process being monitored is experiencing abnormally high concurrency. For example, in FIG. 4, "Conc HighLim" represents a variable (e.g., a binary variable, a flag) that indicates whether the concurrency is abnormally high. Then the compute module proceeds to step 512 to determine whether the system or process has a recent history of stable throughput.

At 512, the compute module can calculate a stableness variable indicating stableness of the throughput variable by dividing the variance (e.g., EWMV) of the throughput variable by the mean (e.g., EWMA) of the throughput variable. For example, in FIG. 4, "Tput IOD" represents such a stableness variable indicating the stableness of the throughput variable.

At 514, the stableness variable calculated at 512 can be compared with a predefined threshold (e.g., 335). Such a comparison can be performed at the compute module (e.g., the compute module 140 in FIG. 1) or the decision module (e.g., the decision module 150 in FIG. 1) of the detection device. If the detection device determines that the stableness variable is greater than the predefined threshold, the detection device can interpret the result as an indication that the system or process being monitored does not have a recent history of stable throughput. In other words, the system or process is not stable enough to generate a baseline of normal behavior. Thus, a fault is not determined in such a scenario. As shown in FIG. 5, the method 500 then returns to step 504 to collect and process next observation of the throughput variable. If the detection device determines that the stableness variable is less than or equal to the predefined threshold, the detection device can interpret the result as an indication that the system or process being monitored has a recent history of stable throughput. Thus, a fault can be detected (e.g., at the decision module of the detection device) for the system or process being monitored, and the detection result can be reported to, for example, a user (e.g., the user 170 in FIG. 1) of the detection device. In some embodiments, the threshold for determining stability of the throughput can be calibrated (e.g., by a user of the detection device) to enable (by increasing the threshold) or suppress (by decreasing the threshold) fault detection for different variables.

Although described with respect to FIGS. 5-6 as the methods 500, 600 being primarily executed at the compute module of the detection device, in some other embodiments, a portion of the operations in the method 500 or 600 can be performed by other modules (e.g., the decision module) of the detection device. For example, as shown in FIGS. 1 and 4, various data or information associated with the detection process 400 can be provided to the decision module 150 of the detection device 100, where a final decision-making process 450 can be executed to generate a detection decision. Specifically, the decision module 150 can receive counter values from the counter module 160; observation data (e.g., "Throughput" and "Concurrency") from the data collection module 130; calculated results (e.g., "Tput LowLim", "Conc HighLim" and "Tput IOD") from the compute module 140, and/or the like.

In some instances, for example, a fault of a system or process can be defined based on an accumulation of inventory or backlog in the system or process. A system or process that is requested to perform work can satisfy the demand by completing the work units and generating throughput. If the demand is satisfied quickly, the work-in-process can be low, and the backlog or inventory can be correspondingly low. The backlog or inventory can be measured by the concurrency variable, as defined above. In some instances, such a concurrency variable can be referred to as, for example, load, load average, run queue, and/or the like.

In some instances, increasing demand can result in increasing concurrency. Increasing concurrency, however, does not necessarily indicate a fault in the system or process. For example, a well-functioning system or process can respond to increased demand with a corresponding increase in throughput. Thus, if concurrency increases and throughput also increases correspondingly, the system or process can experience increased demand, and respond to the increased demand appropriately. In such scenarios, abnormal behavior (e.g., abnormally high throughput and/or concurrency) of the system or process can be external to the system or process, on which the detection method (e.g., the method 500) is applied. Similarly, in some instances, if throughput and concurrency of the system or process are abnormally low, abnormality can exist within a system or process that is generating the demand, thus external to the system or process on which the detection method is applied. Additionally, in some instances, if throughput is abnormally high (e.g., above a threshold) and concurrency is abnormally low (e.g., below a threshold) in a system or process, the system or process can experience increased demand for abnormally small or short units of work, which typically does not constitute a fault within the system or process because the demand can be satisfied quickly.

In some instances, if throughput is abnormally low (e.g., below a threshold) and concurrency is abnormally high (e.g., above a threshold) in a system or process, then the system or process may be unable to complete its backlog by processing units of work in the expected time. Specifically, the system or process may fail to respond appropriately to increased demand. Thus, an internal fault can exist within the system or process. In some instances, a fault of a system or process can be, for example, a failure in a portion of the system or process (e.g., a remote procedure call, a disk input/output (I/O) operation) that is delegated. Additionally, the thresholds used above can be configured, for example, by a user of the detection method to detect the situation of abnormally low throughput and abnormally high concurrency.

Figure 7:
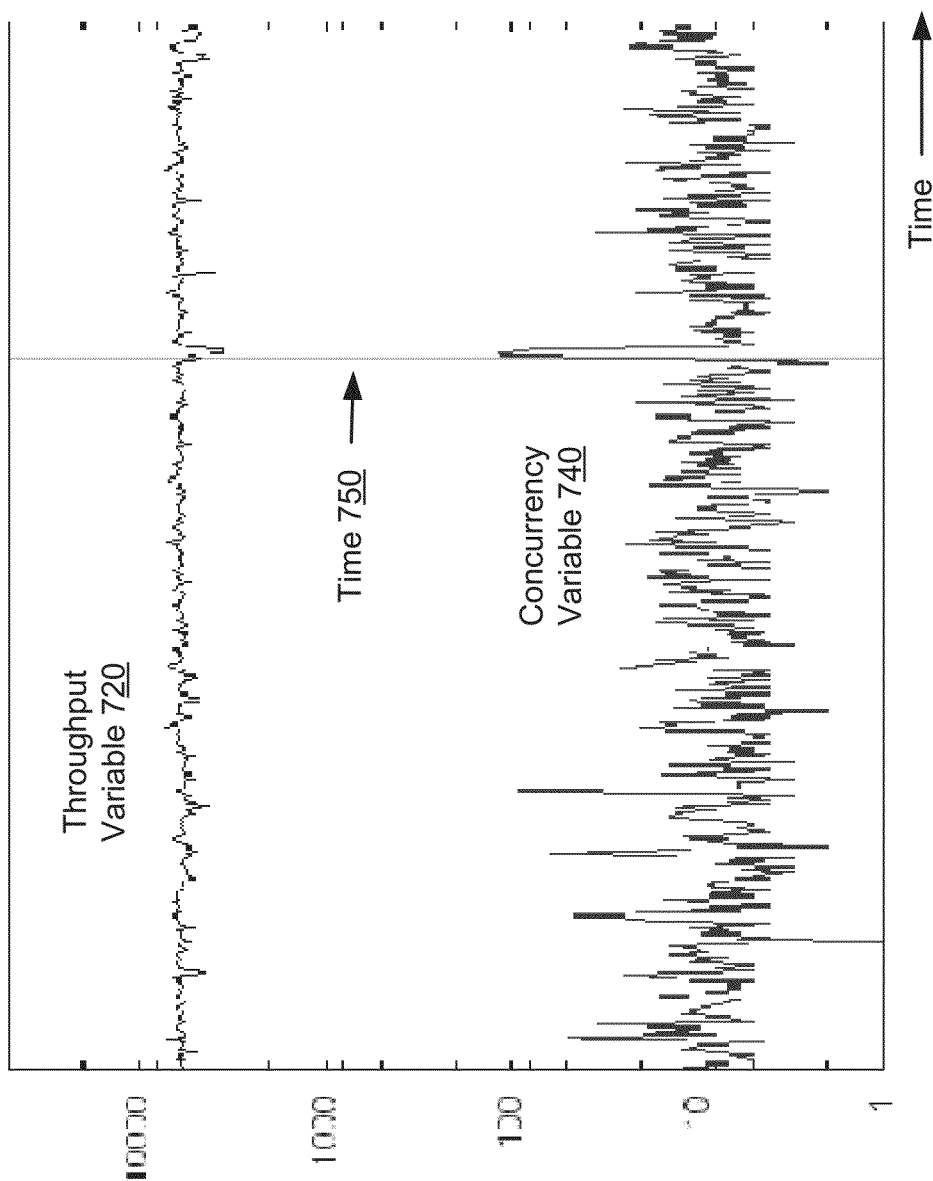
FIG. 7 is a diagram illustrating results of performing a detection method for a system or process, according to an embodiment.

FIG. 7 is a diagram illustrating results of performing a detection method (e.g., the method 300 shown and described with respect to FIG. 5) for a system or process, according to an embodiment. Specifically, the diagram illustrates a throughput variable 720 and a concurrency variable 740 of the system or process changing with time (e.g., represented by the X-axis). Although shown as continuous curves in FIG. 7, in some embodiments, the curve for the throughput variable 720 or the concurrency variable 740 can be generated based on a set of observations of the corresponding variable that are collected from the system or process at different times. The detection method can be applied to detect internal faults for the system or process based on the results shown in FIG. 7. For example, the detection method can be used to detect an abnormally low throughput and an abnormally high concurrency that occur substantially simultaneously at the time 750 (identified by the vertical line in FIG. 7). As described above, such a situation can indicate an internal fault of the system or process. Thus, the detection method can determine that an internal fault of the system or process occurs at the time 750.

In some embodiments (not shown), the detection device 100 can be configured to employ a multiple approaches to determine whether the host device 190 is operating with fault. In some embodiments, at least one of the multiple approaches can be based on observation of one or more variables. In some embodiments, at least one of the multiple approaches can be carried out as substantially described herein (e.g., executed by the detection device 100, and/or by any of the methods 200, 300, 500, 600).

In some embodiments, each approach from the multiple approaches can indicate whether the host device 190 is operating with a fault or not, such that multiple indications are obtained. In such embodiments, a decision process based on the multiple indications can be used to determine whether the host device 190 is operating with a fault. In some embodiments, the decision process can be a consensus, a majority-vote, and/or combinations of the multiple indications.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, .NET, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

What is claimed is:

1. A method, comprising:
    receiving, at a data collection module implemented in at least one of a memory or a processing device, from a processing system, an observation value for a variable, the observation value of the variable associated with operation of the processing system at a time;
    computing a deviation value of the variable from a baseline value at the time based on the observation value;
    computing, after receiving a predetermined number of observation values of the variable, a stableness value of the variable at the time based on the baseline value and a variance of the variable during a time period including the time; and
    transmitting an indication of the processing system as operating with a fault in response to the deviation value meeting a first criterion and the stableness value meeting a second criterion.

2. The method of claim 1, wherein the deviation value is inversely correlated with a standard deviation of the variable at the time, the computing the deviation value of the variable includes setting the deviation value of the variable to zero if the standard deviation of the variable is less than a threshold.

3. The method of claim 1, wherein the deviation value of the variable meets the first criterion if the deviation value of the variable is greater than or equal to a normalcy threshold for the variable.

4. The method of claim 1, wherein the transmitting the indication of the processing system as operating with the fault is further in response to the observation value meeting a third criterion defined based on the baseline value.

5. The method of claim 1, wherein the baseline value is an exponentially weighted moving average (EWMA) of the variable.

6. The method of claim 1, wherein the stableness value is directly correlated with the variance of the variable.

7. The method of claim 1, wherein the variance of the variable is an exponentially weighted moving variance (EWMV) of the variable.

8. The method of claim 1, wherein the stableness value of the variable meets the second criterion if the stableness value is less than a stability threshold.

9. The method of claim 1, wherein the variable is a first variable, the method further comprising:
    receiving, at the data collection module, from the processing system, an observation value for a second variable associated with operation of the processing system; and
    computing a deviation value of the second variable from a baseline value of the second variable at the time based on the observation value for the second variable,
    the transmitting including transmitting the indication of the processing system as operating with the fault in response to the deviation value of the first variable meeting the first criterion, the stableness value meeting the second criterion, and the deviation value of the second variable meeting a third criterion.

10. The method of claim 1, wherein the variable is a first variable, the method further comprising:
receiving, at the data collection module, from the processing system, an observation value for a second variable associated with operation of the processing system, one of the first variable or the second variable associated with throughput of the processing system, and the other of the first variable and the second variable associated with concurrency of the processing system; and
computing a deviation value of the second variable from a baseline value of the second variable at the time based on the observation value for the second variable,
the transmitting including transmitting the indication of the processing system as operating with the fault in response to the deviation value of the first variable meeting the first criterion, the stableness value meeting the second criterion, and the deviation value of the second variable meeting a third criterion.

11. An apparatus, comprising:
a data collection module implemented in at least one of a memory or a processing device, the data collection module configured to receive, from a host device, an observation value for a variable, the observation value of the variable associated with operation of the host device at a time, the observation value of the variable being associated with an observation at the time;
a counter module configured to determine that a predetermined number of observations for the variable has been received prior to the time;
a compute module operatively coupled to the data collection module and the counter module, the compute module configured to compute a deviation value of the variable from a baseline value based on the observation value and based on the predetermined number of observations; and
a decision module operatively coupled to the compute module, the decision module configured to send an indication, to a user device, that the host device is operating with a fault at the time in response to the observation value meeting a first criterion and the deviation value meeting a second criterion.

12. The apparatus of claim 11, wherein the compute module is configured to compute a stableness value of the variable at the time based on the baseline value and a variance of the variable during a time period including the time,
the decision module configured to send the indication that the host device is operating with the fault in response to the observation value meeting the first criterion, the deviation value meeting the second criterion, and the stableness value meeting a third criterion.

13. The apparatus of claim 11, wherein the compute module is configured to compute a stableness value of the variable at the time based on the baseline value and a variance of the variable during a time period including the time, the stableness value is directly correlated with a variance of the variable,
the decision module configured to send the indication that the host device is operating with the fault in response to the observation value meeting the first criterion, the deviation value meeting the second criterion, and the stableness value meeting a third criterion.

14. The apparatus of claim 11, wherein the variable is a first variable and the time is a first time within a time period, the data collection module configured to receive an observation value for a second variable associated with operation of the host device at a second time within the time period,
the compute module configured to compute a deviation value of the second variable from a baseline value of the second variable based on the observation value for the second variable,
the decision module configured to send the indication that the host device is operating with the fault at the second time in response to the deviation value of the first variable meeting the first criterion, the deviation value of the second variable meeting a second criterion, and a stableness value of the first variable meeting a third criterion.

15. A method, comprising:
receiving, at a data collection module implemented in at least one of a memory or a processing device, from a processing system, an observation value of a first variable, the observation value of the first variable associated with an operation of the processing system at a first time within a time period;
receiving, at the data collection module, an observation value for a second variable, the observation value of the second variable associated with an operation of the processing system at a second time within the time period;
computing, after receiving a predetermined number of observation values of the first variable and after receiving a predetermined number of observation values of the second variable, a stableness value of the first variable based on a baseline value of the first variable and a variance of the first variable during the time period; and
transmitting an indication that the processing system is operating with a fault in response to the observation value of the first variable meeting a first criterion, the observation value of the second variable meeting a second criterion, and the stableness value meeting a third criterion.

16. The method of claim 15, wherein one of the first variable or the second variable is associated with throughput of the processing system, and the other of the first variable and the second variable is associated with concurrency of the processing system.

17. The method of claim 15, further comprising:
computing a deviation value of the first variable from the baseline value of the first variable at the first time based on the observation value for the first variable;
computing a deviation value of the second variable from a baseline value of the second variable at the second time based on the observation value for the second variable;
the transmitting the indication is further in response to the deviation value of the first variable meeting a fourth criterion and the deviation value of the second variable meeting a fifth criterion.

18. The method of claim 15, wherein the stableness value is directly correlated with the variance of the first variable, and the stableness value meets the third criterion if the stableness value is less than a stability threshold.

19. A method, comprising:
receiving, at a data collection module implemented in at least one of a memory or a processing device, from a processing system, an observation value for a variable, the observation value of the variable associated with operation of the processing system at a time;
computing a deviation value of the variable from a baseline value at the time based on the observation value, the baseline value being an exponentially weighted moving average (EWMA) of the variable;

computing a stableness value of the variable at the time based on the baseline value and a variance of the variable during a time period including the time; and transmitting an indication of the processing system as operating with a fault in response to the deviation value meeting a first criterion and the stableness value meeting a second criterion.

20. The method of claim 19, wherein the variable is a first variable, the method further comprising:

receiving, at the data collection module, from the processing system, an observation value for a second variable associated with operation of the processing system, one of the first variable or the second variable associated with throughput of the processing system, and the other of the first variable and the second variable associated with concurrency of the processing system; and computing a deviation value of the second variable from a baseline value of the second variable at the time based on the observation value for the second variable, the transmitting including transmitting the indication of the processing system as operating with the fault in response to the deviation value of the first variable meeting the first criterion, the stableness value meeting the second criterion, and the deviation value of the second variable meeting a third criterion.

21. The method of claim 19, wherein the deviation value is inversely correlated with a standard deviation of the variable at the time, the computing the deviation value of the variable includes setting the deviation value of the variable to zero if the standard deviation of the variable is less than a threshold.

* * * * *